(12) United States Patent
Tanaka et al.

(10) Patent No.: US 11,811,988 B2
(45) Date of Patent: Nov. 7, 2023

(54) IMAGE-FORMING APPARATUS

(71) Applicant: SEIKO EPSON CORPORATION, Tokyo (JP)

(72) Inventors: Yoshiyuki Tanaka, Matsumoto (JP); Tomoyuki Higuchi, Shiojiri (JP); Kenji Yanagisawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/648,689

(22) Filed: Jan. 24, 2022

(65) Prior Publication Data

US 2022/0236682 A1 Jul. 28, 2022

(30) Foreign Application Priority Data

Jan. 25, 2021 (JP) ................................. 2021-009362

(51) Int. Cl.
*H04N 1/00* (2006.01)
*G03G 15/22* (2006.01)
*G03G 21/16* (2006.01)

(52) U.S. Cl.
CPC ....... *H04N 1/00519* (2013.01); *G03G 15/221* (2013.01); *G03G 21/1619* (2013.01);
(Continued)

(58) Field of Classification Search
CPC ........... G03G 21/1619; G03G 21/1623; G03G 21/1633; G03G 2221/1678;
(Continued)

(56) References Cited

U.S. PATENT DOCUMENTS 6,238,042 B1 * 5/2001 Kobayashi ........... B41J 2/17506
347/86
6,658,218 B2 * 12/2003 Krolczyk ............... B65H 43/00
399/21
(Continued)

FOREIGN PATENT DOCUMENTS

CN 204222385 U * 3/2015
JP 2010260260 A * 11/2010
(Continued)

*Primary Examiner* — Ryan D Walsh
(74) *Attorney, Agent, or Firm* — WORKMAN NYDEGGER

(57) ABSTRACT

An image-forming apparatus includes, in a body having a predetermined house, an image-reading unit and an image-forming unit that is configured to form an image read by the image-reading unit. A discharge portion is configured to discharge a sheet on which the image was formed onto a discharge tray. An intra-apparatus-discharge space is formed in the body between the image-reading unit and the image-forming unit. The housing includes therein a consumption article mounting portion in which a consumption article used by the image-forming unit is mounted. At least a portion of a surface of the housing at a region of the consumption article mounting portion has a light-transmissive property. When the consumption article is consumed and needs to be replenished, the operator can visually check the region of the consumption article mounting portion in the housing from the outside of the body through the transparent portion.

11 Claims, 8 Drawing Sheets

(52) U.S. Cl.
CPC ..... *G03G 21/1623* (2013.01); *G03G 21/1633* (2013.01); *H04N 1/00631* (2013.01); *G03G 2221/169* (2013.01); *G03G 2221/1678* (2013.01); *H04N 2201/0094* (2013.01)

(58) Field of Classification Search
CPC ......... G03G 2221/169; H04N 1/00519; H04N 1/00631; H04N 1/23; H04N 2201/0094
See application file for complete search history.

(56) References Cited

U.S. PATENT DOCUMENTS

| | | | | |
|---|---|---|---|---|
| 7,422,302 | B2* | 9/2008 | Tanaka | B41J 2/1752 347/19 |
| 2004/0213590 | A1* | 10/2004 | Schroath | G03G 15/70 399/21 |
| 2006/0008292 | A1* | 1/2006 | Watanabe | G03G 15/6552 399/107 |
| 2007/0140708 | A1* | 6/2007 | Yonekawa | G03G 15/553 399/12 |
| 2008/0286002 | A1* | 11/2008 | Akiyama | G03G 21/1633 399/114 |
| 2009/0147324 | A1* | 6/2009 | Tamura | H04N 1/00519 358/498 |
| 2011/0303687 | A1 | 12/2011 | Amemiya | |
| 2013/0169720 | A1* | 7/2013 | Nakamura | B41J 2/1752 347/86 |
| 2016/0187825 | A1* | 6/2016 | Ueda | G03G 15/5016 399/88 |
| 2017/0131679 | A1* | 5/2017 | Koyanagi | G03G 21/1633 |
| 2017/0282609 | A1* | 10/2017 | Yatsunami | B65H 5/062 |
| 2018/0101114 | A1* | 4/2018 | Takeuchi | G03G 15/5016 |
| 2018/0194142 | A1* | 7/2018 | Tanaka | B41J 29/13 |
| 2019/0193296 | A1* | 6/2019 | Mikoshiba | D04H 1/413 |
| 2020/0254773 | A1* | 8/2020 | Netsu | B41J 2/17523 |
| 2021/0053355 | A1* | 2/2021 | Usuda | B41J 2/17513 |
| 2021/0229447 | A1* | 7/2021 | Takiguchi | B41J 2/17566 |
| 2022/0239802 | A1* | 7/2022 | Tanaka | H04N 1/484 |

FOREIGN PATENT DOCUMENTS

| | | | |
|---|---|---|---|
| JP | 2012-018385 A | | 1/2012 |
| JP | 2020204699 A | * | 12/2020 |
| KR | 20060036722 A | * | 5/2006 |

* cited by examiner

IMAGE-FORMING APPARATUS

The present application is based on, and claims priority from JP Application Serial Number 2021-009362, filed Jan. 25, 2021, the disclosure of which is hereby incorporated by reference herein in its entirety.

BACKGROUND

1. Technical Field

The present disclosure relates to an image-forming apparatus, and more particularly to an image-forming apparatus that accommodates a removable consumption article.

2. Related Art

A laser-color copier, which is a type of image-forming apparatus, accommodates a toner unit as a consumption article. In the related art laser-color printer disclosed in JP-A-2012-018385, a door that is a part of the body can be opened and closed, and it is necessary to open the door when the toner unit is detached and attached. This door is a part of the exterior of the body and is colored in the same color as the other parts.

In the above-described related art image-forming apparatus, since the door constitutes a part of the exterior, the door is colored in the same color as other parts of the exterior. Therefore, an inexperienced user will not know the location of the door for replacing the consumption article. That is, there is a problem that a user will not know the location for attachment and detachment of the consumption article.

The present disclosure provides an image-forming apparatus wherein a consumption article can be easily attached and detached.

SUMMARY

An image-forming apparatus according to the present disclosure includes the following configuration: in a body having a predetermined housing, an image-reading unit configured to read a document placed on a document placement surface; an image-forming unit configured to form, on a predetermined sheet, an image read by the image-reading unit; a discharge portion configured to discharge the sheet on which the image was formed by the image-forming unit; and a discharge tray on which the sheet discharged from the discharge portion is placed, wherein an intra-apparatus-discharge space is formed in the body in between the image-reading unit and the image-forming unit; the housing includes therein a consumption article mounting portion in which a consumption article used by the image-forming unit is mounted; and at least a portion of a surface of the housing at a region of the consumption article mounting portion has a light-transmissive property.

In the above-described configuration, when the image-reading unit reads the document placed on the document placement surface, the image-forming unit forms the image read by the image-reading unit on a predetermined sheet, and the discharge portion discharges the sheet on which the image was formed by the image-forming unit and places the sheet on the discharge tray. In addition, an intra-apparatus-discharge space is formed in the body in between the image-reading unit and the image-forming unit, the housing includes therein a consumption article mounting portion in which a consumption article used by the image-forming unit is mounted, and at least a portion of a surface of the housing at a region of the consumption article mounting portion has the light-transmissive property.

Therefore, when the consumption article is consumed and needs to be replenished, the operator can visually check a part of the region of the consumption article mounting portion in the housing from the outside of the body through the portion of the surface that has the light-transmissive property.

DESCRIPTION OF EMBODIMENTS

Hereinafter, embodiments of the present disclosure will be described with reference to the drawings.

Figure 1:
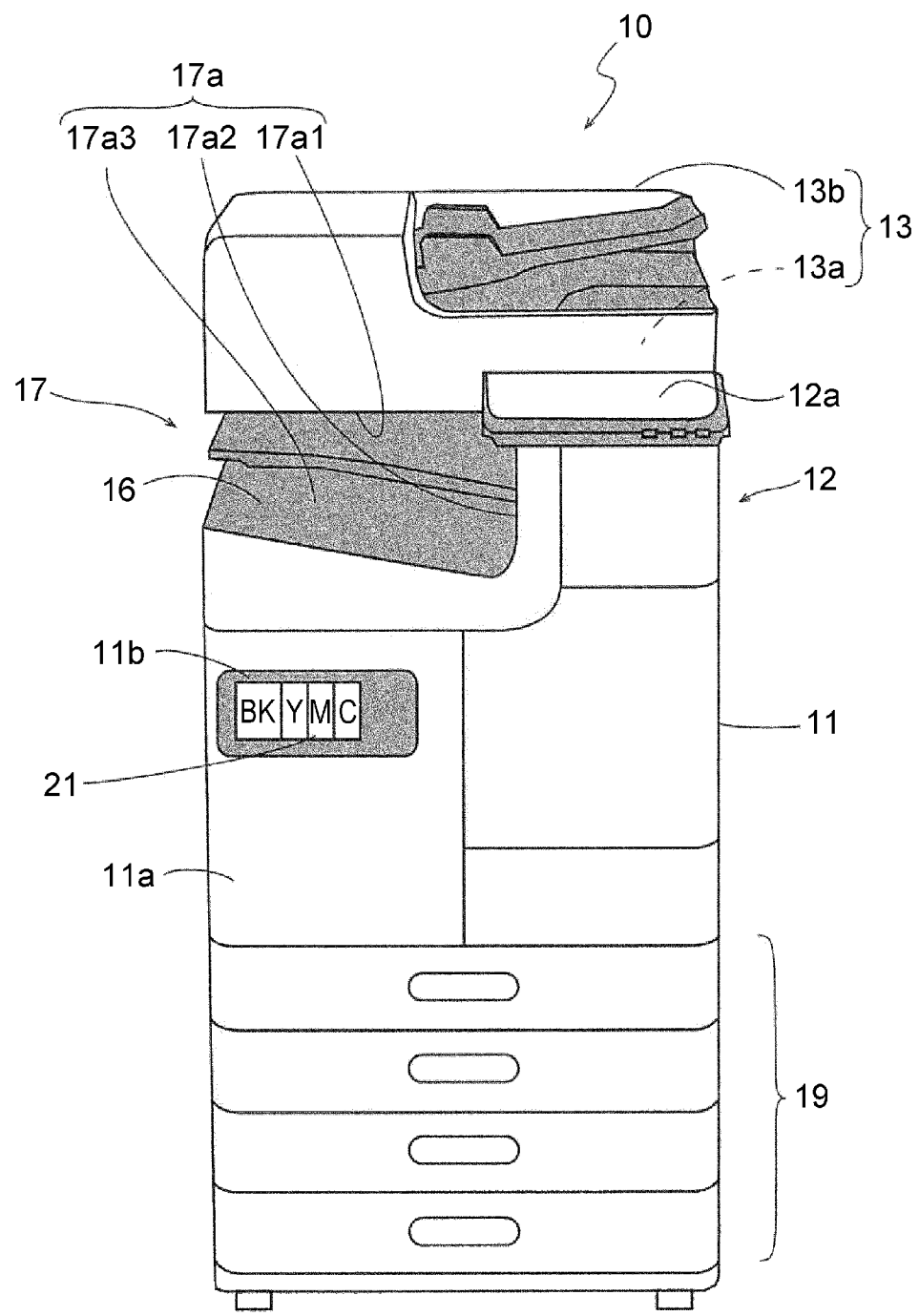
FIG. 1 is a perspective view of an external appearance of an image-forming apparatus.
Figure 2:
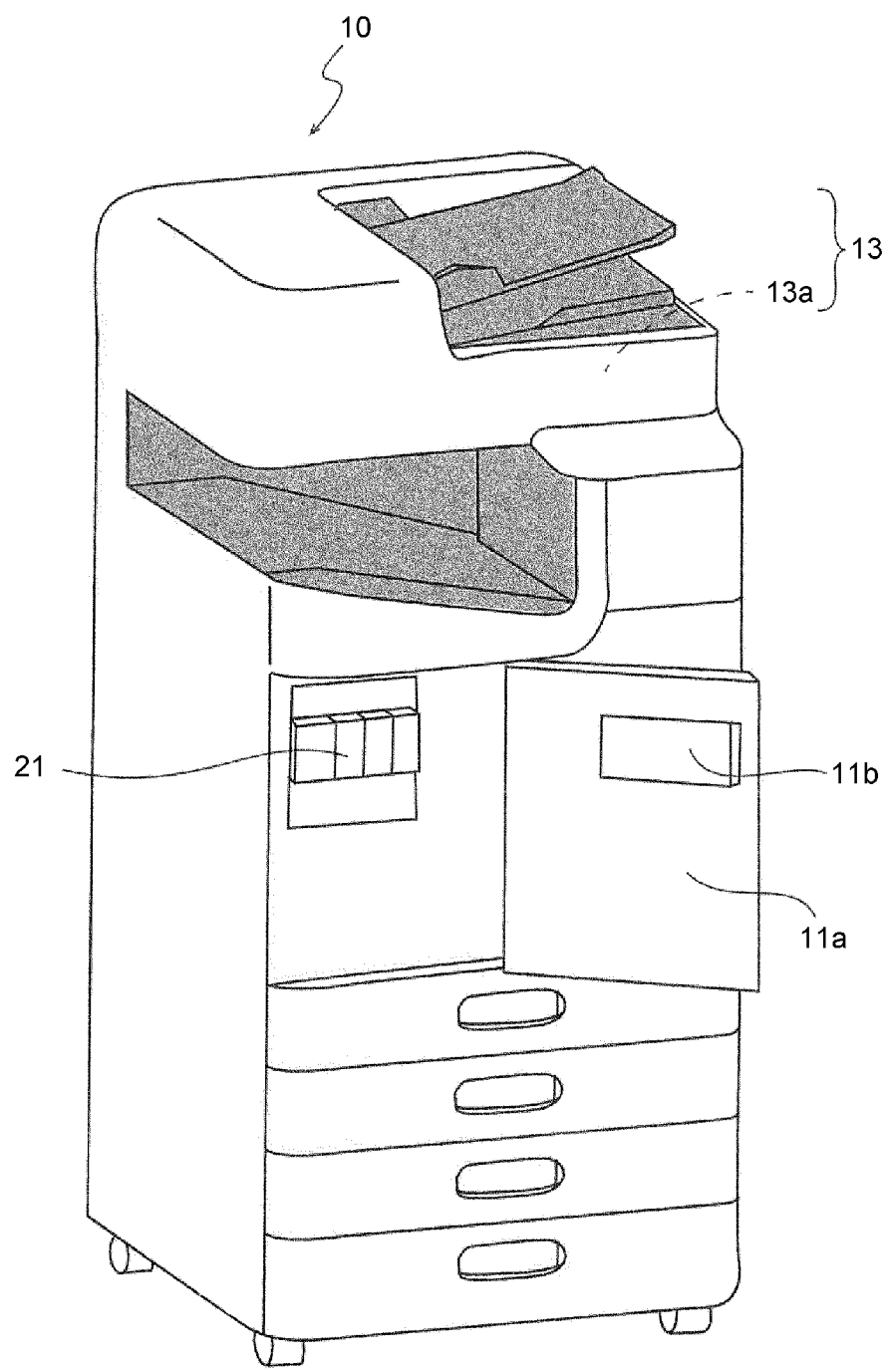
FIG. 2 is a perspective view of an external appearance of the image-forming apparatus in a state in which a door is opened.

FIG. 1 is a perspective view showing an external appearance of an image-forming apparatus, and FIG. 2 is a perspective view showing an external appearance of the image forming apparatus in a state where a door is opened.

In FIGS. 1 and 2, the image-forming apparatus 10 includes a body 12 having a substantially prismatic housing 11 having a substantially rectangular shape in plan view. Within the body 12 are provided an image-reading unit 13 for reading a document placed on a document placement surface 13a positioned at the upper part of the housing 11, an image-forming unit 14 that is disposed below the image-reading unit 13 and that is for forming on a predetermined sheet an image read by the image-reading unit 13, a discharge portion 15 for discharging the sheet on which the image was formed by the image-forming unit 14, and a discharge tray 16 on which is placed the sheet discharged from the discharge portion 15. Note that in this embodiment, an automatic document feeder (ADF) 13b is attached as a part of the image-reading unit 13, and the document placement surface 13a is located below the ADF 13b.

The housing 11 of the body 12 is positioned below the image-reading unit 13 and is formed with an intra-apparatus-discharge space 17 opening forward and leftward. Except for the intra-apparatus-discharge space 17, the body 12 has the housing 11 vertically continuous on the rear and right sides of the intra-apparatus-discharge space 17. The housing 11 overall is colored in a white-based bright color, and a wall surface 17a forming the intra-apparatus-discharge space 17 is generally colored in a dark color. However, a portion of the image-reading unit 13 of the housing 11, such as the document placement surface 13a on which the document is placed and the location of the ADF 13b where a document is discharged, is also darkly colored.

Of the wall surface 17a, an upper-wall surface 17a1 (ceiling portion) is formed horizontally, a right-wall surface 17a2 is formed vertically, and a lower-wall surface 17a3 (bottom portion) is a sloping surface inclining leftward and declining rightward.

Since the image-forming unit 14 is accommodated in the body 12 below the intra-apparatus-discharge space 17, the intra-apparatus-discharge space 17 is formed in the body 12 in between the image-reading unit 13 and the image-forming unit 14. In this way, the intra-apparatus-discharge space 17 is formed in the body 12 in between the image-reading unit 13 and the image-forming unit 14, although there may be a portion on the rear side and the right side where the intra-apparatus-discharge space 17 does not exist between the image-reading unit 13 and the image-forming unit 14.

Figure 3:
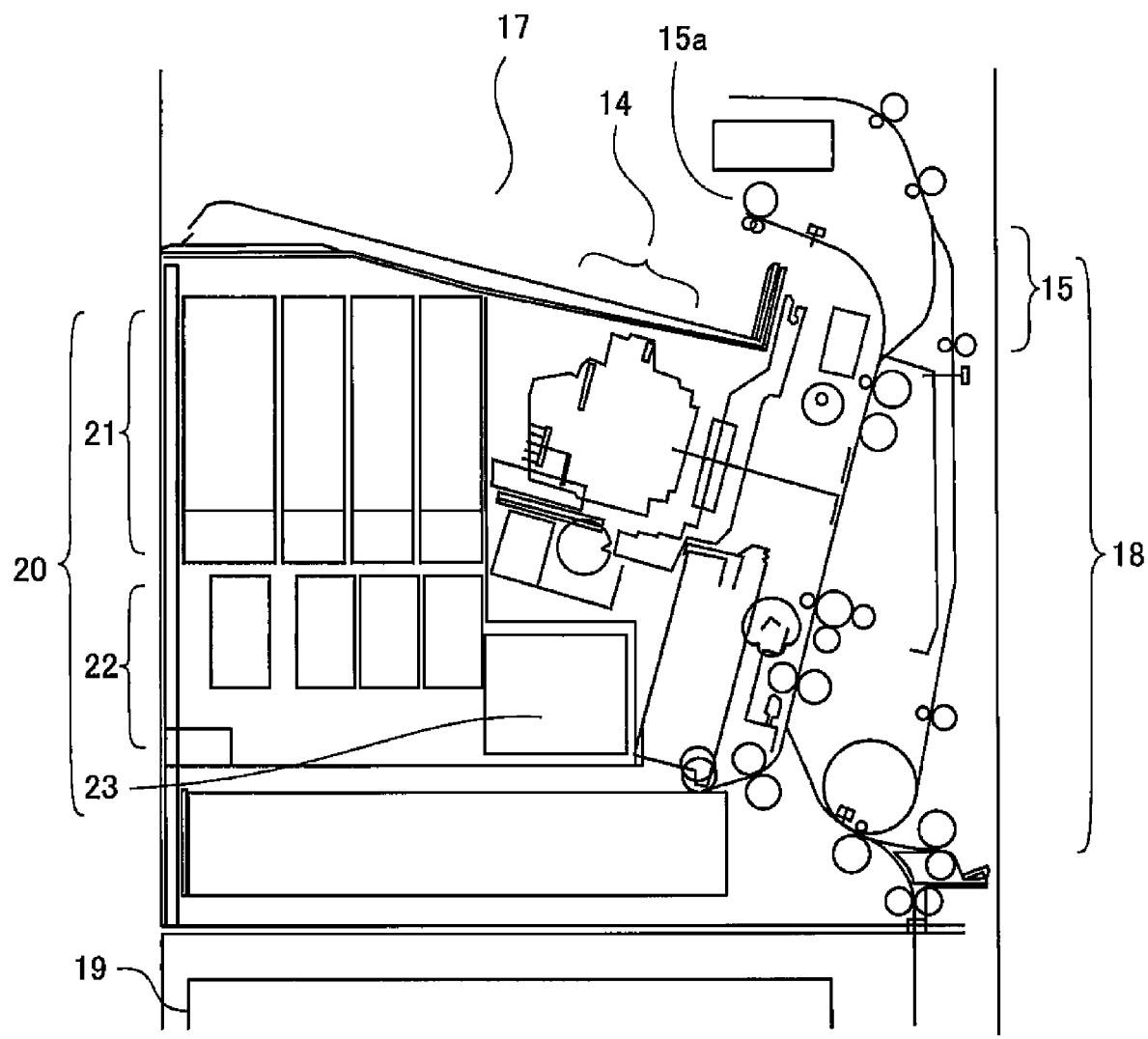
FIG. 3 is a schematic diagram illustrating the main configuration of the image-forming apparatus.

FIG. 3 is a schematic view showing the main configuration of the image-forming apparatus.

FIG. 3 shows a portion below the intra-apparatus-discharge space 17, and the discharge tray 16 is formed at the bottom surface of the intra-apparatus-discharge space 17. The discharge tray 16 is formed so as to be a sloping surface inclining leftward and declining rightward. As described above, the wall surface 17a forming the intra-apparatus-discharge space 17 is colored in a substantially dark color, and of the wall surface 17a, the upper portion (ceiling portion) is formed horizontally, the right wall surface is formed vertically, and the lower portion (bottom portion) is a sloping surface inclining leftward and declining rightward. Note that an operation panel 12a is formed in the body 12 to the right of the intra-apparatus-discharge space 17 so as to protrude forward. The operation panel 12a is overall colored in a dark color, and a predetermined operation switch, a display, and the like are arranged on its operation part.

A sheet discharge port 15a of the discharge portion 15 is formed at the right side of the intra-apparatus-discharge space 17, and the discharge portion 15 discharges a sheet on which an image was formed by the image-forming unit 14, which is disposed below the intra-apparatus-discharge space 17, through the sheet discharge port 15a and onto the discharge tray 16.

The discharge portion 15 constitutes a part of a transport unit 18, which includes a conveyor belt, a roller, and the like. The transport unit 18 transports a paper sheet from one of several levels of paper cassettes 19, which are arranged in the lower part of the body 12, to the image-forming unit 14 and discharges the paper sheet formed with a image. A part of the transport unit 18 is a mechanism for drawing the paper sheet out from the paper cassette 19, conveying the paper sheet in the image-forming unit 14, and discharging the paper sheet in the discharge portion 15. The transport unit 18 in the present embodiment handles all transport, but may be mechanisms that function separately at each stage.

In the image-forming apparatus 10, paper sheet transport is performed at the right side portion inside the body 12, and in this process, an image is formed on the paper sheet by the inkjet image-forming unit 14, and a space is formed at the left side of the image-forming unit 14 below the intra-apparatus-discharge space 17. In this space is provided a consumption article mounting portion 20 of the image-forming apparatus 10. In the consumption article mounting portion 20, ink cartridges 21 are stored in the upper part, an ink-supply unit 22 is disposed below, and a waste-liquid box 23 is disposed in the vicinity thereof. The predetermined colors of ink contained in the ink cartridges 21 are supplied to the head of the image-forming unit 14 through the ink-supply unit 22 and used to form an image. In addition, waste liquid discharged at the time of head cleaning, which is performed at a predetermined timing, is collected in the waste-liquid box 23. The ink cartridges 21 and the ink-supply unit 22 are collectively referred to as an ink-supply portion, and the waste-liquid box 23 is also referred to as a waste-liquid container.

The ink cartridges 21 are stored in the body 12 below the intra-apparatus-discharge space 17 and to the left of the image-forming unit 14, and the ink cartridges 21 need to be detachable for consumption article replacement when the colored ink is depleted. Therefore, a door 11a for opening up the consumption article mounting portion 20 to the outside is formed at the front surface of the housing 11. The door 11a is formed in a rectangular shape in a front view, is pivotably supported at the upper end and the lower end on the right side, and can be opened and closed with the left end drawing an arc. Therefore, the door 11a is also referred to as an openable cover. The door 11a overall is colored in the same white-based bright color as the housing 11, but includes a transparent portion 11b formed to be transparent at a partial region of the ink cartridges 21. That is, at least a portion of a surface in the door 11a, which configures the housing 11, at the region of the consumption article mounting portion 20 is provided with the transparent portion 11b, which is formed to be transparent. An outer edge portion of the transparent area in the transparent portion 11b is formed in a dark color.

In this way, the image-forming unit 14 is supplied with ink from the ink cartridges 21 and the ink-supply unit 22, which are an ink-supply portion, and forms an image on a paper sheet (sheet). The ink-supply portion corresponds to a consumption article. Further, a waste-liquid container, which is the waste-liquid box 23, for recovering waste liquid discharged from the image-forming unit 14 is provided, and this waste-liquid container also corresponds to a consumption article.

Next, the operation of the present embodiment configured as described above will be explained.

Normally, when the image-forming apparatus 10 reads a document placed on the document placement surface 13a of the image-reading unit 13, the image-forming unit 14 forms an image read by the image-reading unit 13 on a predetermined sheet, and the discharge portion 15 discharges the sheet on which the image was formed by the image-forming unit 14 and places the sheet on the discharge tray 16 of the intra-apparatus-discharge space 17.

When an image is formed by the image-forming unit 14, the colored ink is supplied from the ink cartridge 21 of the ink-supply portion and is consumed. The ink cartridges 21 are arranged in the consumption article mounting portion, and the transparent portion 11b is formed in the door 11a in correspondence with a portion of the region of this consumption article mounting portion. Therefore, when it becomes necessary to replace an ink cartridge 21, which is a consumption article, the operator, when looking at the body 12, can visually check the ink cartridge 21 inside through the transparent portion 11b. Therefore, the consumption article mounting portion can be easily visually checked, and an ink cartridge 21 can be taken out by opening the door 11a, and replaced with a new ink cartridge 21. An outer edge of the transparent portion 11b is colored dark, and the boundary between the ink cartridge 21 and the housing 11 is a dark-colored region. This results in a dark-colored region arranged between the brightly colored housing 11 and the outer peripheral surface of the ink cartridges 21, which produces a calming appearance and enables improvement of the overall balance by adjusting the width of the dark-colored region. Note that the ink cartridges 21 may have transparent or translucent cases that enable a user to know the remaining amount of the colored inks inside.

The image-forming apparatus 10 of the above-described embodiment is provided with several levels of the paper cassettes 19 in the lower portion, and has a height that facilitates work when installed on the floor of an office. Of course, the present embodiment is not limited to such a configuration.

Figure 4:
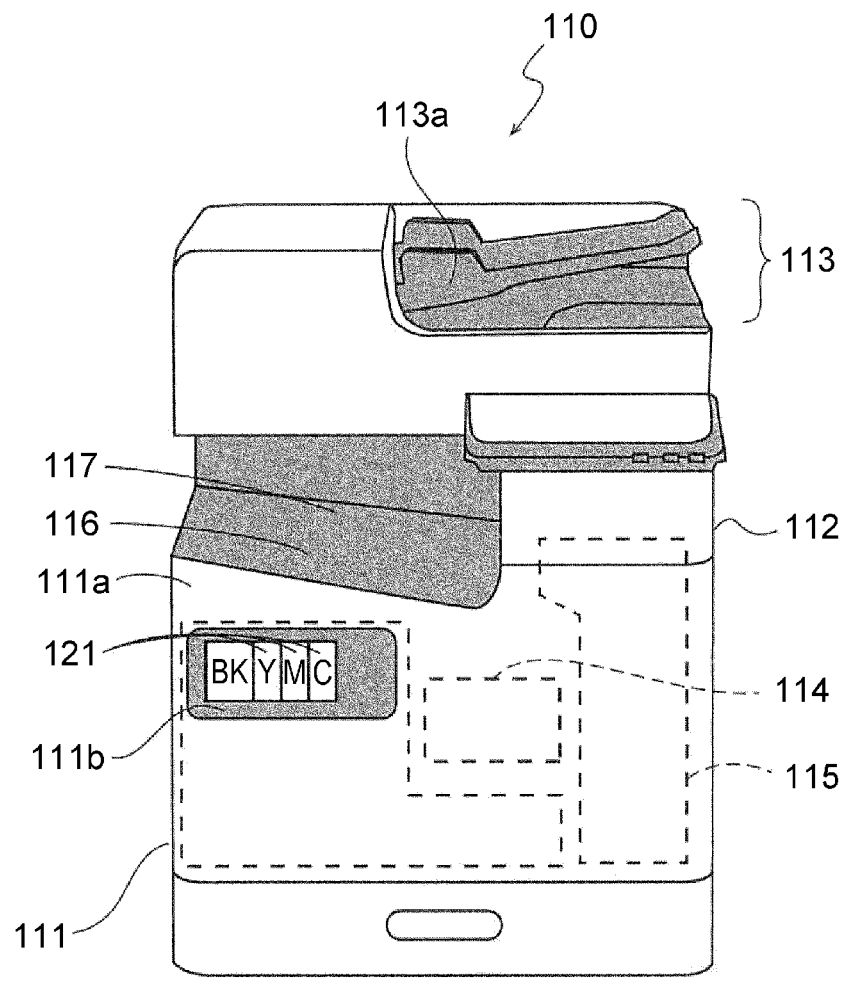
FIG. 4 is a perspective view of an external appearance of an image-forming apparatus according to a modification.

FIG. 4 is an external perspective view of an image-forming apparatus according to a modification.

An image-forming apparatus 110 according to this modification is provided with a body 112 having a substantially prismatic housing 111 that is shorter in the height direction than is the image-forming apparatus 10 of the above-described embodiment, an image-reading unit 113 located in the upper part, an image-forming unit 114 that is disposed below the image-reading unit 113 and that is for forming on a predetermined sheet an image read by the image-reading unit 113, a discharge portion 115 for discharging the sheet on which the image was formed by the image-forming unit 114, and a discharge tray 116 on which is placed the sheet discharged from the discharge portion 115.

The discharge tray 116 is located within an intra-apparatus-discharge space 117 formed between the image-reading unit 113 and the image-forming unit 114. A consumption article mounting portion below the intra-apparatus-discharge space 117 is formed between the image-reading unit 113 and the image-forming unit 114 in the body 112. A front surface portion of the housing 111 is a door 111a which can be opened and closed as a whole, and when the door 111a is opened, an internal consumption article mounting portion is exposed to the outside. A transparent portion 111b is formed at a location in a portion of the door 111a corresponding to a portion of the region of the consumption article mounting portion. To be more specific, the transparent portion 111b is formed so as to face a side surface portion of ink cartridges 121 accommodated in the consumption article mounting portion.

Thus, when it is necessary to replace an ink cartridge 121, which is a consumption article, the storage position of the ink cartridge 121 can be directly visually checked through the transparent portion 111b of the door 111a, and the operator will not be confused during the replacement operation about where the ink cartridge 121 is located in the body 112. Further, the ink cartridges 121, which constitute the ink-supply portion, themselves are transparent vessels, so the remaining amount of the ink can be visually checked through the transparent portion 111b.

It should be noted that the body 112 overall is colored in a white-based bright color, and a document placement surface 113a, the intra-apparatus-discharge space 117, and the peripheral portion of the transparent portion 111b are colored in a dark color.

In the above-described embodiment, the transparent portion is provided at a position facing the ink cartridges. However, what is included in the consumption article mounting portion is not limited to ink cartridges.

Figure 5:
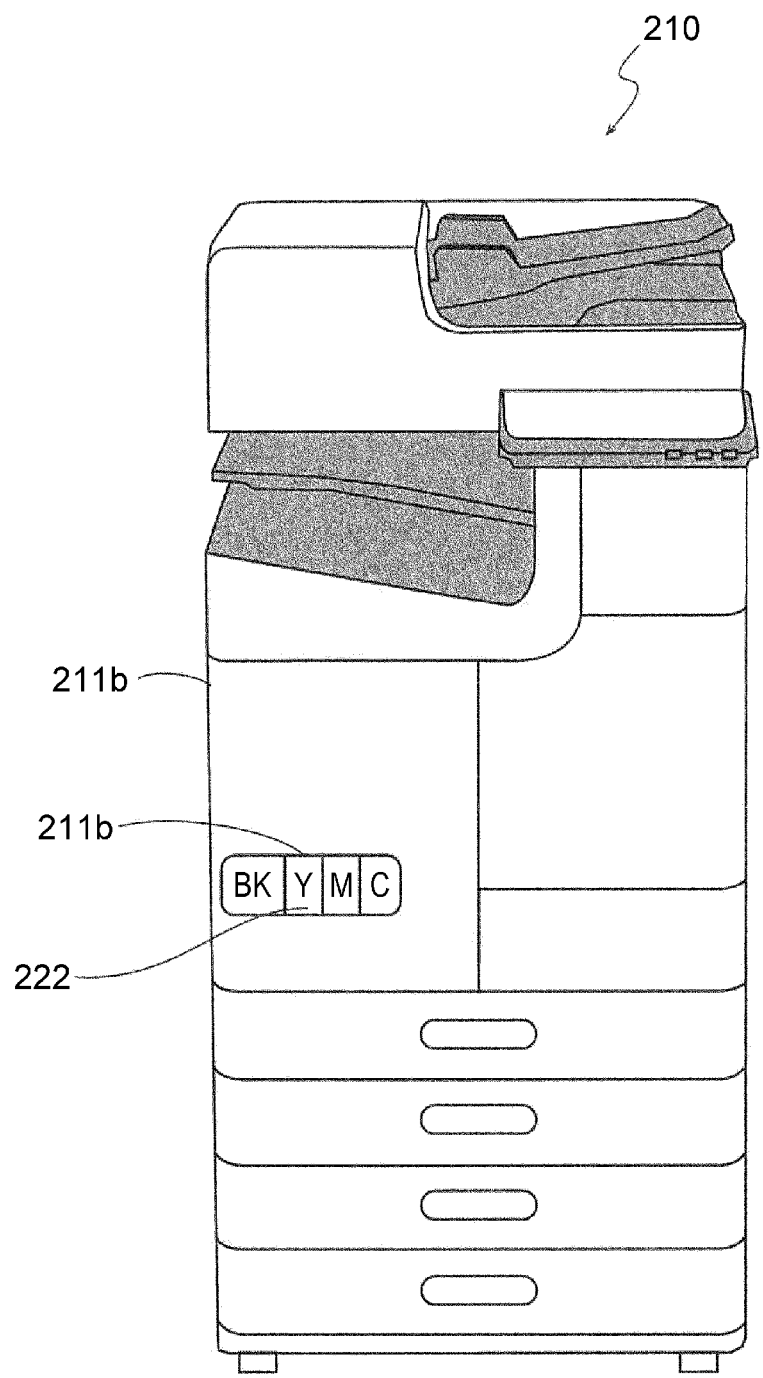
FIG. 5 is a perspective view of an external appearance of an image-forming apparatus according to a modification.

FIG. 5 is an external perspective view of an image-forming apparatus according to a modification.

In the case of this image-forming apparatus 210, a transparent portion 211b is formed at a different location than in the image-forming apparatus 10 shown in FIG. 1. The transparent portion 211b is formed at a position facing a mount region of a sub tank 222 of the ink-supply portion included in the consumption article mounting portion. Although the ink cartridges (not shown) are what are detachable, the installation location of the sub tank 222, which is coupled to the ink-supply portion, can be seen through the transparent portion 211b, and thus an operator can visually confirm that a consumption article mounting portion is in that area. If the position of the consumption article mounting portion can be visually confirmed, the corresponding door 211a can be easily specified, and it becomes easy to perform the exchange work of an ink cartridge by opening and closing the door 211a.

In the above-described embodiment, the wall surface 17a forming the intra-apparatus-discharge space 17 is dark colored, but from the viewpoint of design, the dark portion may be extended to include the intra-apparatus-discharge space 17 and its periphery.

Figure 6:
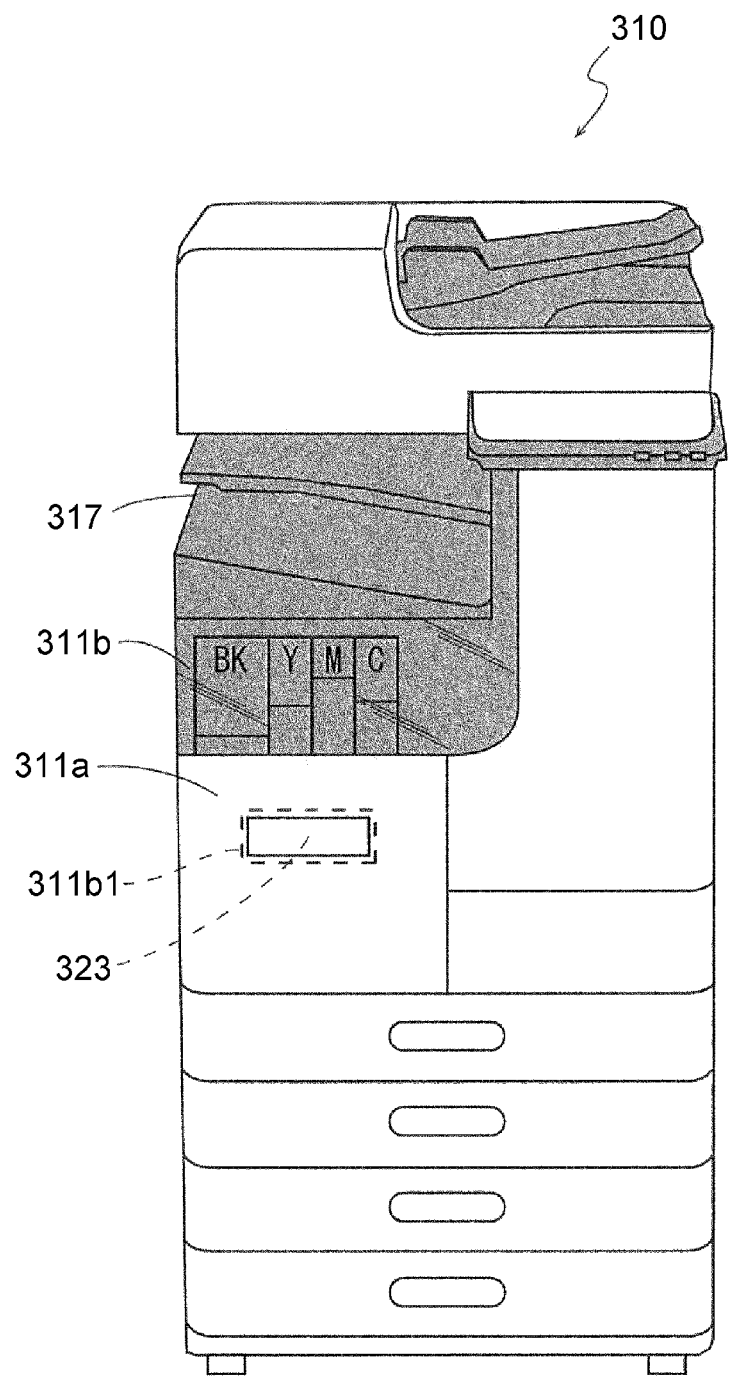
FIG. 6 is a perspective view of an external appearance of an image-forming apparatus according to a modification.
Figure 7:
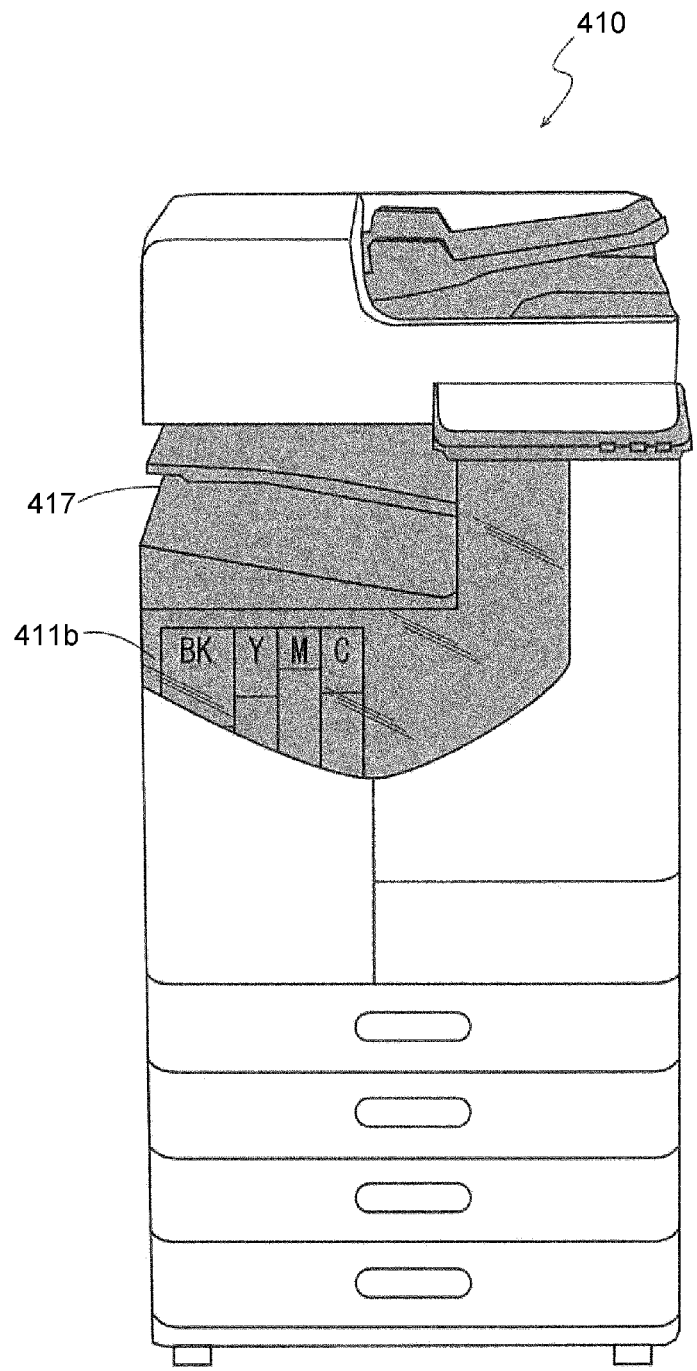
FIG. 7 is a perspective view of an external appearance of an image-forming apparatus according to a modification.

FIGS. 6 and 7 are external perspective views of an image-forming apparatus according to modifications.

In the image-forming apparatus 310 shown in FIG. 6, a dark color portion is formed continuous from an intra-apparatus-discharge space 317 into the consumption article mounting portion directly below. In this case, a transparent portion 311b is formed of a smoke-tinted transparent plate, and is a design continuous as a dark-colored region from directly below the intra-apparatus-discharge space 317, while enabling visual confirmation of the inside to understand the position of the consumption article mounting portion.

Since a waste-liquid container 323 is also included in the consumption article mounting portion, a further transparent portion 311b1 may be provided in a door 311a at a position corresponding to the waste-liquid container 323.

Also in an image-forming apparatus 410 shown in FIG. 7, a dark color portion is formed continuous from an intra-apparatus-discharge space 417 into the consumption article mounting portion directly below, and a transparent portion 411b is formed of a smoke-tinted transparent plate, and is a design as a dark color region continuous from the intra-apparatus-discharge space 417.

In addition, to correspond with the design in which the transparent portion 411b inclines downward to the right, the dark color portion inclines upward to the right from the lowest end to form a left/right symmetrical design. The balance in design is good. Also, in this case also, the inside can be visually checked through the transparent portion 411b, and the position of the consumption article mounting portion can be easily understood.

Figure 8:
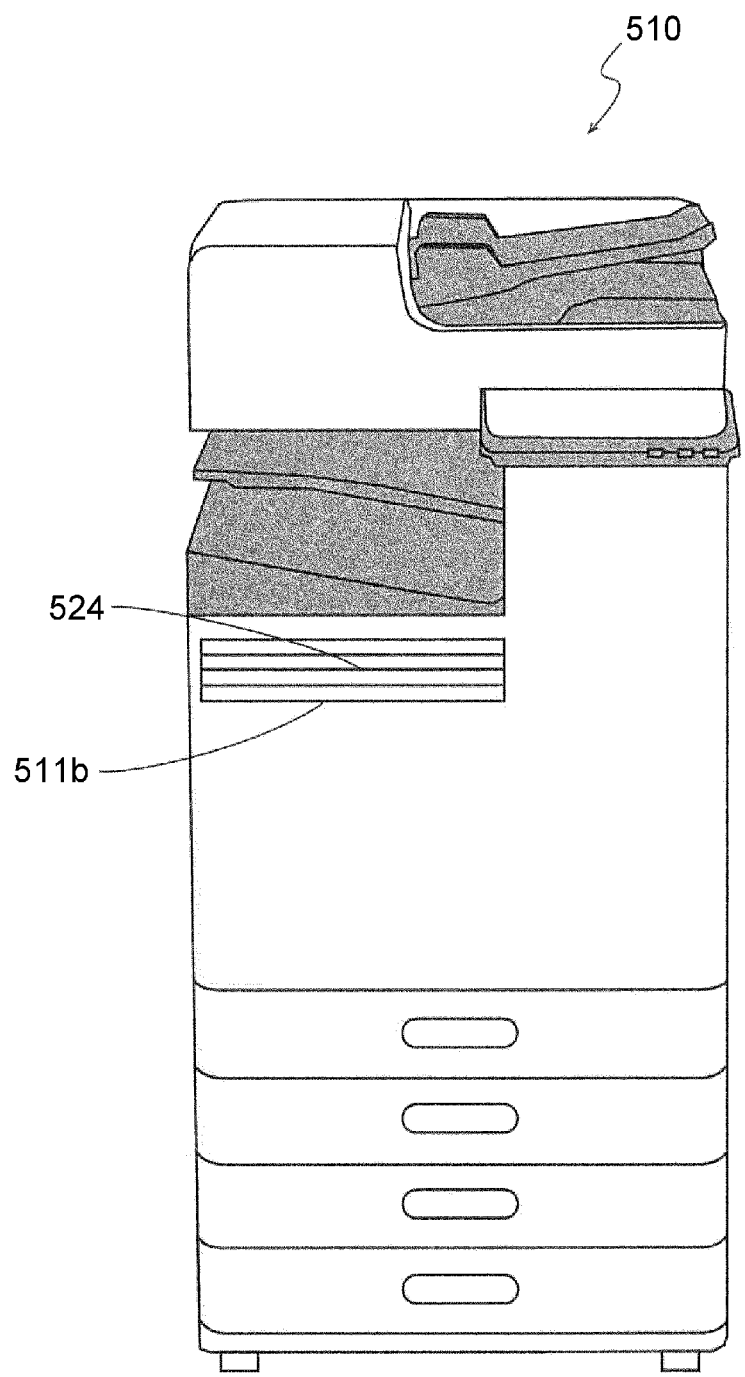
FIG. 8 is a perspective view of an external appearance of an image-forming apparatus according to a modification.

FIG. 8 is an external perspective view of an image-forming apparatus according to a modification. In the image-forming apparatus 510 of this modification, a transparent portion 511b corresponds to a portion corresponding to the ink-flow path. The ink-flow path easily brings to mind the consumption article mounting portion, and informs an operator that the consumption article mounting portion is somewhere around the ink-flow path 524, so that the attachment/detachment work can be performed more easily.

In the above-described embodiment, since the transparent portion is provided, the consumption article mounting portion can be visually checked from the outside. However, to make it easier to visually check, a light-emitting unit may be disposed inside the housing, so that by emitting light from inside, light is emitted from the inside to the outside.

As an example, a light-emitting element such as a light emitting diode (LED) is arranged at the far side of the ink cartridge 21 so as to emit light from the back of the ink cartridge 21 toward the transparent portion 11b. Similarly, light may be emitted from the far side of the sub tank 222, which is an ink-supply portion, toward the transparent portion 211b. Further, in the same way, a light-emitting element such as an LED may be arranged on the far side of the waste-liquid box 23 or the ink-flow path 524 so as to emit light toward the transparent portion 11*b*, 511*b* from behind the waste-liquid box 23 or the ink-flow path 524.

Needless to say, this disclosure is not limited to the above-described embodiments. It will be appreciated by those skilled in the art that the following are disclosed as embodiments in the present disclosure:

the combinations of mutually replaceable members, configurations, and the like disclosed in the above embodiments may be suitably changed and applied;

although not disclosed in the above-described embodiments, members, configurations, and the like disclosed in the above embodiments may be suitably replaced with members, configurations, and the like that are known in the art and that can mutually replace them, or the combinations thereof may be changed, and applied; and although not disclosed in the above-described embodiments, a person skilled in the art may, based on known techniques and the like, suitably replace members, configurations, and the like disclosed in the above-described embodiments with members, configurations, and the like that can be assumed to be substitutes, or may modify and apply combinations thereof.

What is claimed is:

1. An image-forming apparatus comprising:
in a body having a predetermined housing:
an image-reading unit configured to read a document placed on a document placement surface;
an image-forming unit configured to form, on a predetermined sheet, an image read by the image-reading unit;
a discharge portion configured to discharge the sheet on which the image was formed by the image-forming unit; and
a discharge tray on which the sheet discharged from the discharge portion is placed, wherein
an intra-apparatus-discharge space is formed in the body in between the image-reading unit and the image-forming unit;
the housing includes a cover that is openable, and a consumption article mounting portion in which a consumption article used by the image-forming unit is mounted, and accessible to open the cover,
at least a portion of a surface of the housing at a region of the consumption article mounting portion has a transparent portion and another region that is a bright color,
a peripheral region of the transparent portion is colored in a dark color,
a document placement surface, and the intra-apparatus-discharge space are colored in a dark color, and
between the dark color of the intra-apparatus-discharge space and the transparent portion is the bright color in the vertical direction.

2. The image-forming apparatus according to claim 1, wherein
the transparent portion is formed below the intra-apparatus-discharge space.

3. The image-forming apparatus according to claim 1, wherein
the image-forming unit is supplied with ink from an ink-supply portion to form an image on the sheet, and the consumption article is the ink-supply portion.

4. The image-forming apparatus according to claim 3, wherein
the housing includes an openable cover for attaching and detaching the ink-supply portion or a waste-liquid container, the waste-liquid container containing waste liquid discharged from the image-forming unit, and
the transparent portion is formed in at least a part of the openable cover.

5. The image-forming apparatus according to claim 3, wherein
the ink-supply portion is formed to be transparent.

6. The image-forming apparatus according to claim 3, further comprising:
a sub tank coupled to the ink-supply portion, wherein the transparent portion is formed in a mount region of the sub tank.

7. The image-forming apparatus according to claim 1, further comprising:
a waste-liquid container that contains waste liquid discharged from the image-forming unit, wherein
the consumption article is the waste-liquid container.

8. The image-forming apparatus according to claim 1, further comprising:
a light-emitting unit formed inside the housing for illuminating the consumption article.

9. The image-forming apparatus according to claim 8, wherein
the image-forming unit is supplied with ink from an ink-supply portion via an ink flow path to form an image on the sheet, and the light-emitting unit illuminates the ink-flow path.

10. The image-forming apparatus according to claim 8, wherein
the light-emitting unit emits light from inside an ink-supply portion toward outside through the transparent portion.

11. An image-forming apparatus comprising:
in a body having a predetermined housing:
an image-reading unit configured to read a document placed on a document placement surface;
an image-forming unit configured to form, on a predetermined sheet, an image read by the image-reading unit;
a discharge portion configured to discharge the sheet on which the image was formed by the image-forming unit; and
a discharge tray on which the sheet discharged from the discharge portion is placed, wherein
an intra-apparatus-discharge space is formed in the body in between the image-reading unit and the image-forming unit;
the housing includes a cover that is openable and a consumption article mounting portion in which a consumption article used by the image-forming unit is mounted and accessible to open the cover,
at least a portion of a surface of the cover at a region of the consumption article mounting portion has a transparent portion, and another region is a bright color,
a peripheral region of the consumption article mounting portion is colored in a dark color,
a document placement surface, and the intra-apparatus-discharge space are colored in a dark color, and
the dark color of the intra-apparatus-discharge space and the peripheral region of the consumption article mounting portion have an overlapping region in the lateral width direction.

* * * * *